US010669890B2

(12) United States Patent
Schwarz et al.

(10) Patent No.: US 10,669,890 B2
(45) Date of Patent: Jun. 2, 2020

(54) COMPARTMENT SHIELDING

(71) Applicant: UNITED TECHNOLOGIES CORPORATION, Farmington, CT (US)

(72) Inventors: Frederick M. Schwarz, Glastonbury, CT (US); Lisa I. Brilliant, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/404,217

(22) Filed: May 6, 2019

(65) Prior Publication Data

US 2019/0323380 A1  Oct. 24, 2019

Related U.S. Application Data

(63) Continuation of application No. 14/769,392, filed as application No. PCT/US2013/076098 on Dec. 18, 2013, now Pat. No. 10,280,794.

(Continued)

(51) Int. Cl.
*F01D 25/14* (2006.01)
*F01D 5/08* (2006.01)
(Continued)

(52) U.S. Cl.
CPC ............ *F01D 25/145* (2013.01); *F01D 5/02* (2013.01); *F01D 5/08* (2013.01); *F01D 5/12* (2013.01);
(Continued)

(58) Field of Classification Search
CPC ..... F01D 5/02; F01D 5/08; F01D 5/12; F01D 5/24; F01D 5/26
See application file for complete search history.

(56) References Cited

U.S. PATENT DOCUMENTS 2,712,727 A   7/1955  Morley et al.
3,665,763 A   5/1972  Grey
(Continued)

FOREIGN PATENT DOCUMENTS

EP    1965040 A1   9/2008
EP    2246530 A2   11/2010
WO    9522635 A1   8/1995

OTHER PUBLICATIONS

European Search Report for Application No. EP 13 87 8963.
(Continued)

*Primary Examiner* — Mark A Laurenzi
*Assistant Examiner* — Shafiq Mian
(74) *Attorney, Agent, or Firm* — Cantor Colburn LLP

(57) ABSTRACT

A gas turbine engine having an engine axis and method of manufacturing the same is disclosed. The gas turbine engine may comprise a fan configured to drive air, a low pressure compressor section having a core flow path and configured to draw in and compress air flowing along the core flow path, a spool configured to drive the fan, and geared architecture configured to adjust the fan speed. The gas turbine engine may also include a housing defining a compartment that encloses the geared architecture. The housing is disposed between the core flow path and the axis, and includes a shielded mid-section that is in thermal communication with the core flow path of the low pressure compressor section. The shielded mid-section includes an outer layer and an insulator adjacent to the outer layer.

15 Claims, 4 Drawing Sheets

Related U.S. Application Data

(60) Provisional application No. 61/792,110, filed on Mar. 15, 2013.

(51) Int. Cl.

| | | |
|---|---|---|
| *F01D 25/26* | (2006.01) | |
| *F02C 7/14* | (2006.01) | |
| *F02C 7/24* | (2006.01) | |
| *F02C 7/36* | (2006.01) | |
| *F01D 5/02* | (2006.01) | |
| *F01D 5/12* | (2006.01) | |
| *F01D 9/04* | (2006.01) | |
| *F01D 25/24* | (2006.01) | |
| *F02C 3/04* | (2006.01) | |

(52) U.S. Cl.
CPC ............ *F01D 9/041* (2013.01); *F01D 25/24* (2013.01); *F01D 25/26* (2013.01); *F02C 3/04* (2013.01); *F02C 7/14* (2013.01); *F02C 7/24* (2013.01); *F02C 7/36* (2013.01); *F05D 2220/32* (2013.01); *F05D 2260/231* (2013.01); *F05D 2260/40311* (2013.01); *Y02T 50/676* (2013.01)

(56) References Cited

U.S. PATENT DOCUMENTS

| | | | |
|---|---|---|---|
| 3,999,376 A | | 12/1976 | Jeryan et al. |
| 4,699,568 A | * | 10/1987 | Harlamert ............ B64D 15/12 416/155 |
| 4,738,416 A | * | 4/1988 | Birbragher ............ B64D 15/04 244/134 B |
| 4,782,658 A | | 11/1988 | Perry |
| 4,887,424 A | | 12/1989 | Geidel et al. |
| 4,999,994 A | | 3/1991 | Rued et al. |
| 6,647,707 B2 | | 11/2003 | Dev |
| 7,398,641 B2 | * | 7/2008 | Stretton ................ F02C 7/047 244/134 B |
| 7,647,761 B2 | | 1/2010 | Gauthier et al. |
| 7,658,077 B2 | * | 2/2010 | Earith .................... B64D 15/04 60/39.08 |
| 8,015,789 B2 | | 9/2011 | Brand et al. |
| 8,083,030 B2 | | 12/2011 | Portluck |
| 8,278,774 B2 | | 10/2012 | Macchia |
| 2004/0123599 A1 | * | 7/2004 | Ackermann ............ F01D 5/288 60/770 |
| 2008/0190093 A1 | | 8/2008 | Gauthier et al. |
| 2008/0279688 A1 | * | 11/2008 | Jensen .................... F01D 5/08 416/95 |
| 2010/0136323 A1 | | 6/2010 | Varanasi et al. |
| 2010/0143103 A1 | | 6/2010 | Sellars et al. |
| 2013/0239587 A1 | * | 9/2013 | Karl ...................... F02C 3/107 60/805 |
| 2016/0003098 A1 | | 1/2016 | Schwarz et al. |

OTHER PUBLICATIONS

Notification of Transmittal of the International Preliminary Report on Patentability and Written Opinion of the International Searching Authority PCT/US2013/076098; dated Sep. 24, 2015, 10 pages.

* cited by examiner

COMPARTMENT SHIELDING

CROSS REFERENCE TO RELATED APPLICATIONS

This application is a continuation application of U.S. patent application Ser. No. 14/769,392 filed on Aug. 20, 2015, which is a 35 USC § 371 U.S. National Stage Filing of International Patent Application No. PCT/US2013/076098 filed on Dec. 18, 2013, which claims priority under 35 USC § 119(e) to U.S. Provisional Patent Application Ser. No. 61/792,110, filed on Mar. 15, 2013, the contents each of which are incorporated herein by reference thereto.

TECHNICAL FIELD

This present disclosure generally relates to gas turbine engines and, more particularly, gas turbine engines in which a compartment housing geared architecture is disposed adjacent to the low pressure compressor.

BACKGROUND

Gas turbine engines typically include a compressor, at least one combustor in a combustor section, and a turbine. The compressor and turbine each include alternating rings of stationary vanes, and rotating blades. A fan delivers air into the compressor where the air is compressed and then delivered downstream into the combustor section. In the combustor section, the air received from the compressor is mixed with fuel and ignited to create combustion gases that enter the turbine. The turbine is rotatably driven as the high temperature, high pressure combustion gases expand in passing over the blades forming the turbine. Since the turbine is connected to the compressor via one or more shafts, the combustion gases that drive the turbine also drive the compressor, thereby restarting the ignition and combustion cycle.

The compressor in a gas turbine engine typically comprises a low pressure compressor section and a high pressure compressor section. For example, a turbofan jet engine includes a low pressure compressor section disposed between fan at the inlet of the engine and the high pressure compressor section. The low pressure compressor section and the high pressure compressor section increase the pressure of the incoming air stream as it flows along a core air flow path. Both the low pressure compressor section and high pressure compressor section include alternating rings of stationary vanes and rotating blades enclosed in a circumferential case.

A compartment is disposed between the low pressure compressor section and the engine longitudinal axis. The compartment encloses geared architecture and various bearings. Oil or other lubricating fluid is contained in the compartment to lubricate the geared architecture and bearings. Heat from the oil or other lubricating fluid in the compartment may be transferred through the compartment housing to the incoming air traveling in the core air flow path disposed in the low pressure compressor section. In addition, heat from the compartment may also be transferred to the air contained in other compartments in the low pressure compressor section. The heat from the increased air temperature of such other compartments may also be transferred to the core air flow path in the low pressure compressor section. The additional heat transferred undesirably increases the temperature of the air moving along the core air flow path. As a result, there is a need for an improved design that reduces the temperature of air traveling in the core air flow path.

SUMMARY OF THE DISCLOSURE

In accordance with one aspect of the disclosure, a gas turbine engine having an engine axis is disclosed. The disclosed gas turbine engine may comprise a gas generator that includes a core flow path, a propulsor that includes a fan and geared architecture for driving the fan, and a housing defining a first compartment that separates the geared architecture and the core flow path. The housing may include a shielded axial mid-section that includes an outer layer and an insulator adjacent to the outer layer. The mid-section of the housing is in thermal communication with the core flow path of the gas generator. In one refinement, the insulator may be a foam insulator. Alternatively, the insulator may be ceramic.

The mid-section may further include an inner layer. In such an embodiment, the insulator is disposed between the outer layer and the inner layer. In one embodiment, the insulator may be air. In another embodiment, the insulator may be air under vacuum pressure. The mid-section may further include a second insulator, wherein the first and second insulators are disposed between the outer layer and the inner layer.

In one refinement, the gas generator may include a low pressure compressor section configured to draw in and compress air flowing along the core flow path in the low pressure compressor section. In addition, the gas turbine engine may further comprise a spool configured to drive the fan. In such a refinement, the mid-section is in thermal communication with the core flow path in the low pressure compressor section, and the fan has a fan speed and is configured to drive air. Further, the core flow path in the low pressure compressor section includes an inlet through which incoming air from the fan is received, an axial forward portion and an axial main portion. The forward portion extends between the inlet and the main portion. The main portion includes a plurality of stationary vanes and rotating blades. At least a portion of the shielded mid-section forms a common wall between the forward portion of the core flow path and the first compartment. In a refinement, the gas turbine engine may further comprise a second compartment disposed adjacent to the first compartment and the main portion of the core flow path. In such a refinement, the housing of the first compartment may further include a first side section proximal to a fan rotor and a second side section proximal to a low pressure compressor bearing. The second side section may include the outer layer and the insulator. The mid-section is disposed between the first and second side sections, and the first compartment may contain lubricating fluid and the second compartment may contain air.

In accordance with another aspect of the disclosure, a gas turbine engine having an engine axis is also disclosed. The disclosed gas turbine engine may comprise a fan configured to drive air, the fan having a fan speed, a low pressure compressor section having a core flow path, a low pressure turbine section, a spool including an inner shaft that connects the fan and the low pressure compressor section to a low pressure turbine section, geared architecture, and a housing defining a first compartment that encloses the geared architecture and lubricant. The housing is disposed between the low pressure compressor core flow path and the axis. The housing includes a shielded mid-section. The shielded mid-section includes an outer layer and an insulator. The mid-section in thermal communication with the core flow path of the low pressure compressor section. The low pressure compressor section is configured to draw in and compress air flowing along the core flow path. The spool has a spool speed and is configured to drive the fan. The geared architecture is configured to change the fan speed to less than the spool speed. In a refinement, the insulator may be a sprayed-on foam insulator. Alternatively, the insulator may be ceramic. The insulator may face the inside of the first compartment.

The mid-section may further include an inner layer. The insulator may be disposed or sandwiched between the outer layer and the inner layer. In one embodiment, the insulator may be air.

In another refinement, the core flow path in the low pressure compressor section may include an inlet through which incoming air from the fan is received, a forward portion and a main portion. The forward portion may extend between the inlet and the main portion. The main portion may include a plurality of stationary vanes and rotating blades. At least a portion of the shielded mid-section forms a common wall between the forward portion of the core flow path and the first compartment.

In a refinement, the engine may further comprise a second compartment disposed between the first compartment and the main portion of the core flow path, and the housing of the first compartment may further include a first side section proximal to a fan rotor and a second side section proximal to a low pressure compressor bearing. The second side section may include the outer layer and the insulator. The mid-section is disposed between the first and second side sections. The first compartment may also contain lubricating fluid and bearings and the second compartment may contain air.

In accordance with a further aspect of the disclosure, a method for manufacturing a gas turbine engine is also disclosed. The method may comprise providing a low pressure compressor section having a core flow path and configured to draw in and compress air in the core flow path, providing a housing defining a first compartment that encloses lubricating fluid and geared architecture configured to adjust fan speed of the engine, and disposing an insulator adjacent to the outer layer. The housing is disposed between the core flow path and the geared architecture and includes an outer layer configured to be in thermal communication with the core flow path of the low pressure compressor section. The insulator is configured to resist heat transfer from the lubricating fluid to air in the core flow path when the gas turbine engine is operating.

DETAILED DESCRIPTION OF THE DISCLOSED EMBODIMENTS

Figure 1:
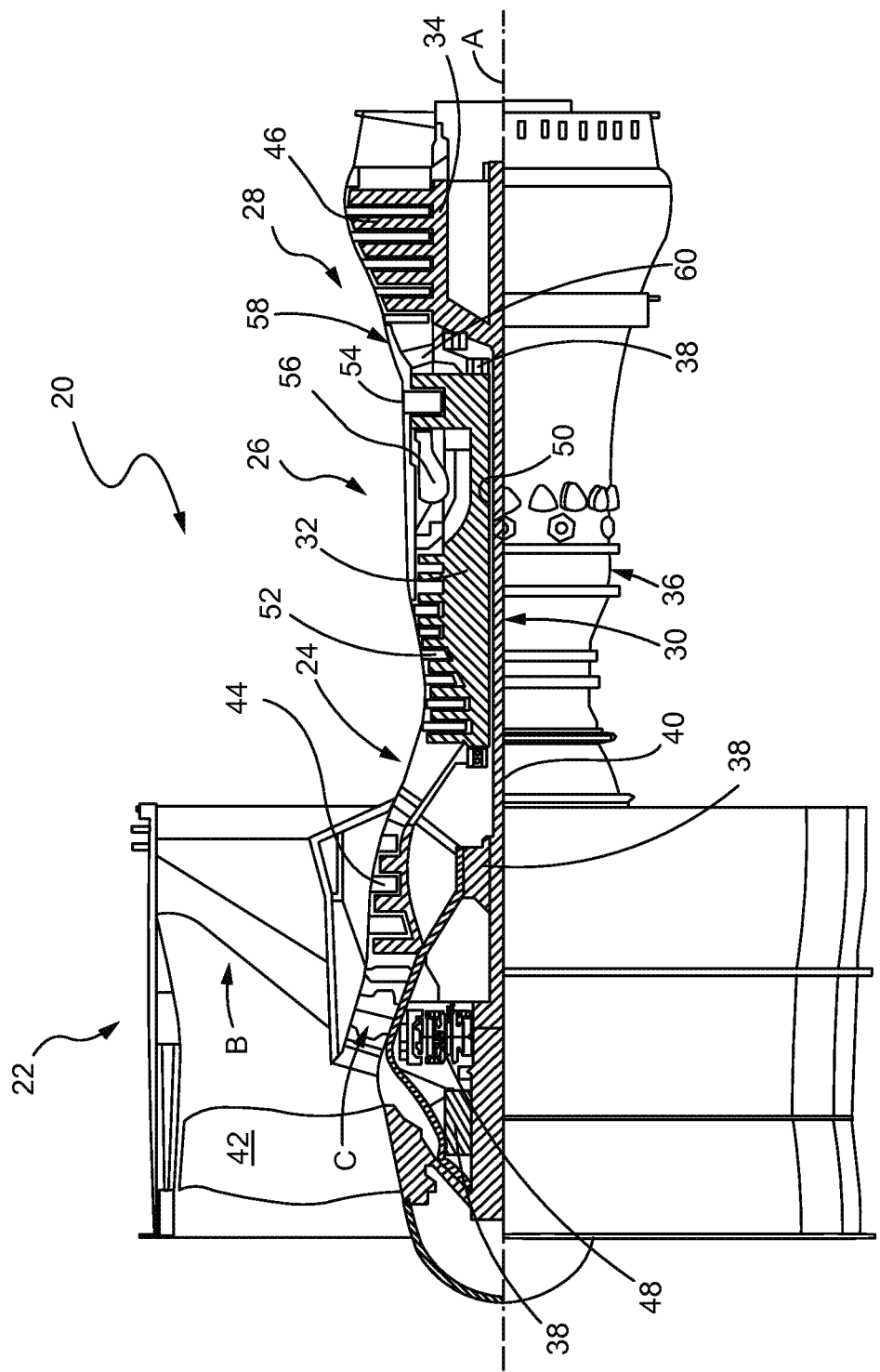
FIG. 1 is a schematic longitudinal sectional view of an exemplary turbofan gas turbine engine that includes a compartment housing as disclosed herein.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed (the fan speed) than the low speed spool 30 (the spool speed). The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The air in the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core flow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, a star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the air in the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency. The use of the gear reduction between the low speed spool 30 and the fan 42 allows an increase of speed to the low pressure compressor 44. In the past, the speed of the low pressure turbine 46 and the low pressure compressor 44 has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the speeds of the low pressure turbine 46 and the low pressure compressor 44 speeds caused partially by a desire to not have unduly high fan speeds.

Figure 2:
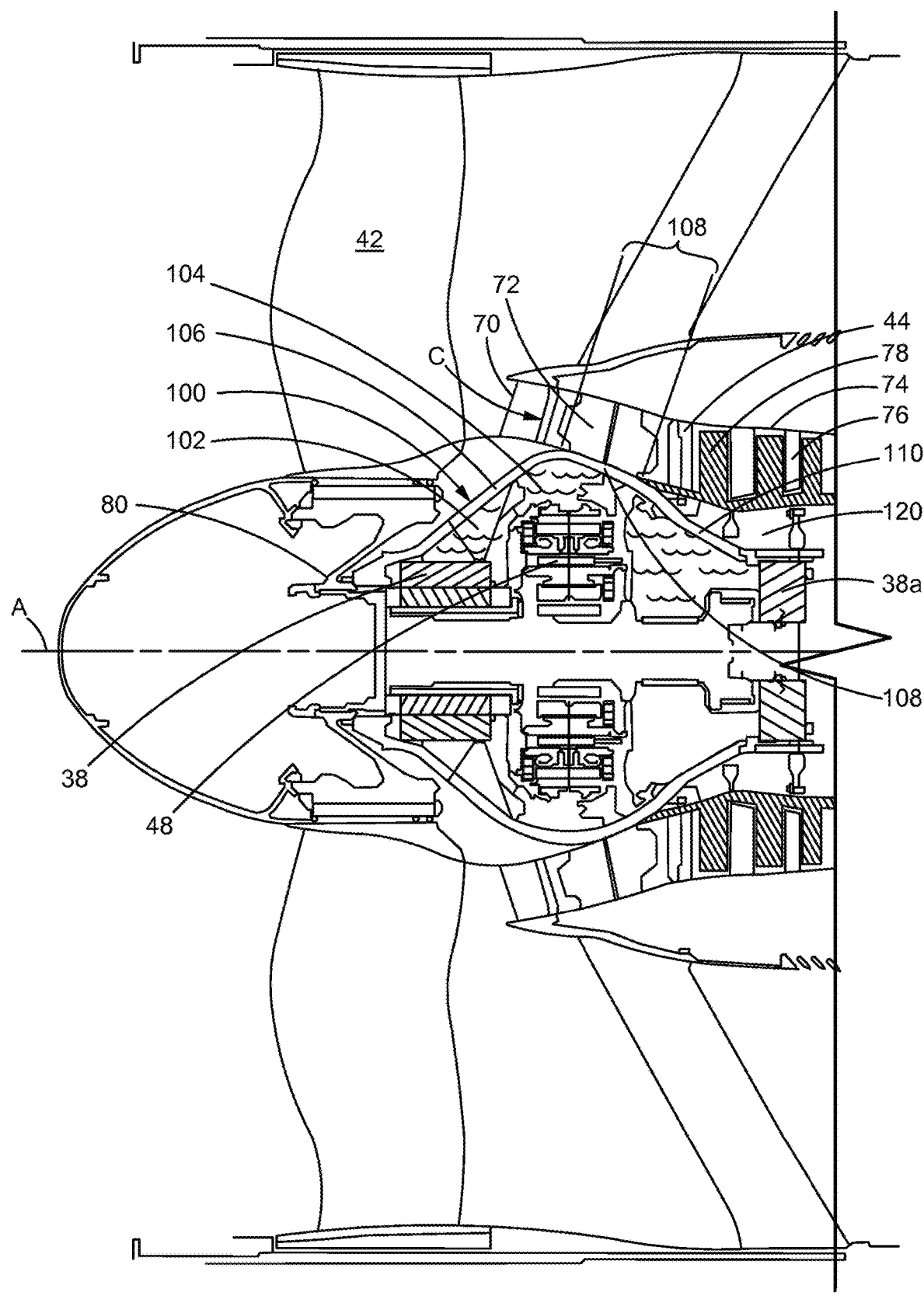
FIG. 2 is a partial sectional view of a turbofan gas turbine engine, particularly illustrating the compartment housing.

Referring now to FIG. 2, there is shown an enlarged schematic view of a selected portion of the exemplary gas turbine engine 20 of FIG. 1. As can be seen in FIG. 2, the core flow path C in the low pressure compressor section 44 includes an inlet 70 through which incoming air from the fan 42 is received, an axial forward portion 72 and an axial main portion 74 of the core flow path C. The forward portion 72 extends between the inlet 70 and the main portion 74. The main portion 74 includes a plurality of stationary vanes 76 and rotating blades 78.

An annular, arcuate housing 100 with a radial peak at the axial center location of the gearbox defines a first compartment 102 that is contoured for enclosing the geared architecture 48. The compartment 102 may also contain lubricating fluid 104, or the like, and various bearing systems 38. The housing 100 may be disposed between the core flow path C and the engine central longitudinal axis A. The housing 100 may comprise a first, forward side section 106, a shielded mid-section 108 and a second, aft side section 110. The mid-section 108 is disposed between the first and second side sections 106, 110.

The first side section 106 is generally proximal to the fan rotor 80 and forward of a radial peak in the housing 100. In many embodiments, the first side section 106 may be a heat conducting material such as a metallic material or semi-metallic material.

The mid-section 108 is in thermal communication with the core flow path C of the low pressure compressor section 44 and is aft of the radial peak in the housing 100. A portion of the mid-section 106 may form a common wall between the forward portion 72 of the core flow path C and the compartment 102.

Figure 3:
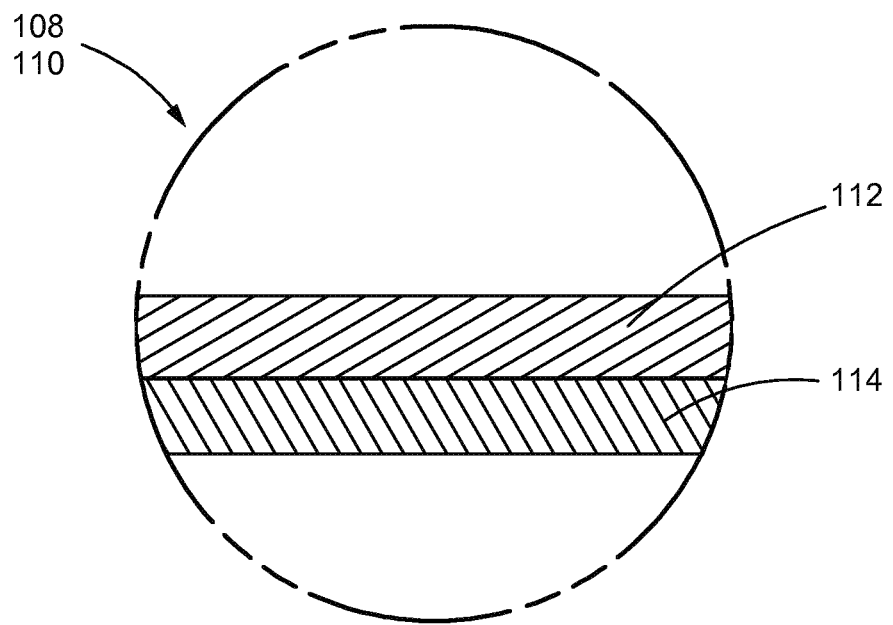
FIG. 3 is an enlarged view illustrating a portion of one embodiment of a shielded section of the compartment housing.

The mid-section 108 includes an outer layer 112 and an insulator 114 adjacent to the outer layer 112. FIG. 3 illustrates such an arrangement. The insulator 114 may be open to the compartment 102 on the side that is not adjacent to the outer layer 112.

Figure 4:
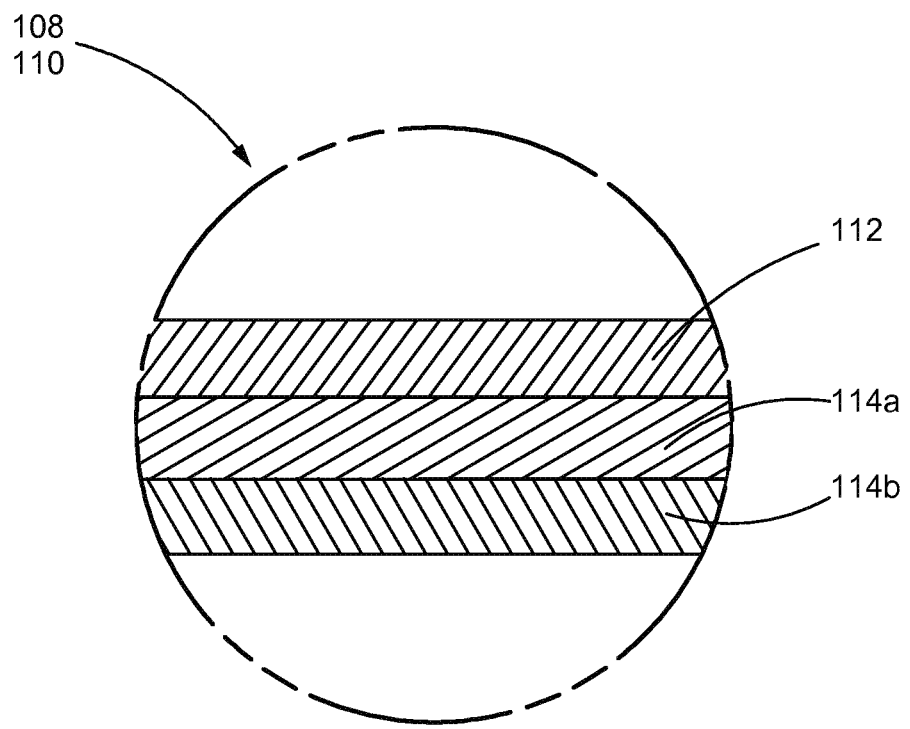
FIG. 4 is an enlarged view illustrating a portion of another embodiment of a shielded section of the compartment housing.

In some embodiments, the mid-section 108 may include a plurality of insulators 114. FIG. 4 illustrates an enlarged view of one embodiment of such an arrangement. In the embodiment illustrated in FIG. 4, a second insulator 114*b* is layered on a first insulator 114*a*. The term "insulator" as used herein may be any composition that resists conduction of heat. Such insulators may be ceramic, foam, air, air under vacuum, or the like. The form of the insulators 114 may be gaseous, liquid, solid, sprayed-on, or the like.

Figure 5:
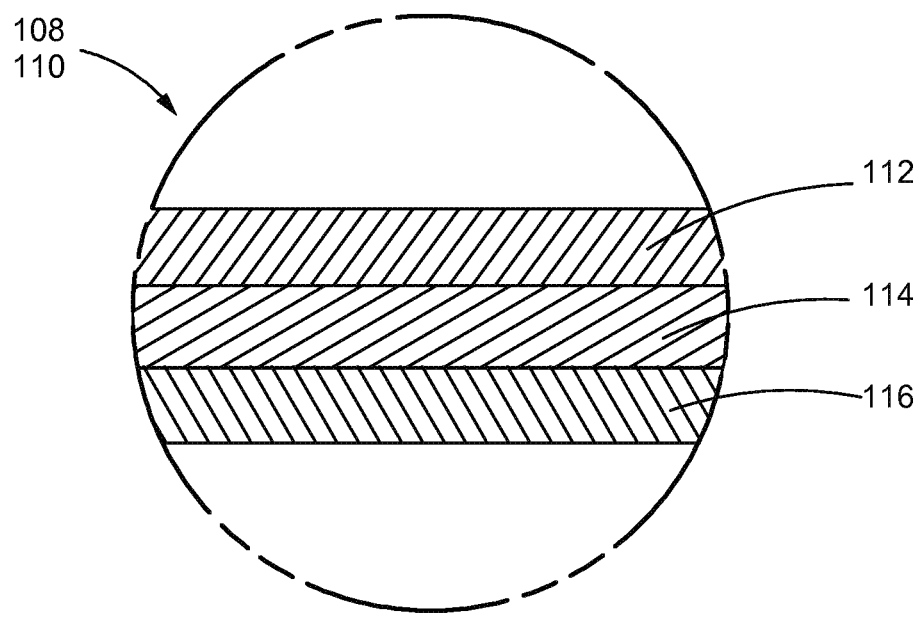
FIG. 5 is an enlarged view illustrating a portion of another embodiment of a shielded section of the compartment housing.

The mid-section 108 may further include an inner layer 116. FIG. 5 illustrates an enlarged view of a mid-section 108 that includes an insulator 114 disposed between the outer layer 112 and the inner layer 116. In one embodiment, the insulator 114 disposed between the outer layer 112 and the inner layer 116 may be air or air under vacuum pressure (air pressure below atmospheric pressure). In other embodiments, the insulator 114 may be a foam, ceramic, or the like.

Figure 6:
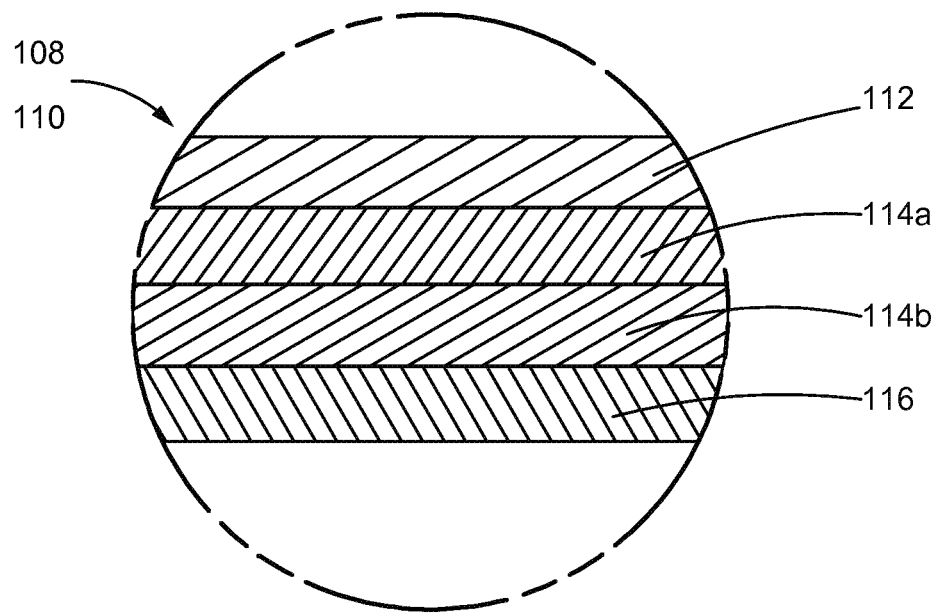
FIG. 6 is an enlarged view illustrating a portion of another embodiment of a shielded section of the compartment housing.

Alternatively, the mid-section 108 may include a plurality of insulators 114 between the outer layer 112 and the inner layer 116. FIG. 6 illustrates an enlarged view of one such an arrangement. In FIG. 6, a second insulator 114b is disposed adjacent to a first insulator 114a. Alternatively, the second 114b or first insulator 114a may be air. Alternatively, the second or first insulators 114a, 114b may be made of foam, ceramic, or another material that resists the conduction of heat. Alternatively, both the outer and inner layers 112, 116 are made of materials that conduct heat, such as metallic or semi-metallic materials.

The second side section 110 is proximal to the low pressure compressor bearing 38a. In some embodiments, the second side section 110 may include the outer layer 112. Alternatively, the second side section 110, in a similar fashion as the mid-section 108, may include the outer layer 112 and one or more the insulators 114 (see for example, FIGS. 3-4). Alternatively, the second side section 110 may include an inner layer 116. In such a case, one or more insulators 114 may be disposed between the outer layer 112 and the inner layer 116 (see, for example, FIGS. 5-6). As noted previously, often, both the outer and inner layers 112, 116 typically may be made of materials that conduct heat, such as metallic, semi-metallic and the like.

As shown in FIG. 2, the gas turbine engine may further comprise a second compartment 120 disposed adjacent to first compartment 102 and the main portion 74 of the core flow path C. The second compartment 120 may contain air or lubricating fluid, among other things.

INDUSTRIAL APPLICABILITY

During operation of the engine, the geared architecture and any bearing assemblies disposed in the first compartment generate heat. The compartment contains lubricating fluid, or the like, that lubricates and cools the geared architecture and bearings by absorbing the heat generated by these elements.

In the absence of shielding on the compartment housing, heat in the lubricating fluid (and air) in the first compartment is conducted through the compartment housing to the core flow path of the low pressure compressor. The heat conducted through the compartment housing heats (or further heats) the air as it moves through the low pressure compressor. In addition, the heat of the first compartment may also be conducted through the first compartment housing to an adjacent compartment, such as the second compartment shown in FIG. 2, thereby raising the temperature in the adjacent compartment. Heat from the increased temperature in the adjacent (second) compartment may be conducted to the portion of the core flow path that is adjacent to such (second) compartment. A better design is needed.

According to the disclosure, the first compartment housing includes one or more shielded sections. The shielded mid-section includes one or more insulators that resist the conduction of heat from the first compartment to the core flow path. Similarly the shielded second side section, may include one or more insulators that resist the conduction of heat from the first compartment, which includes the geared architecture, to the second compartment which may be in thermal communication with other portions of the core flow path. The shielded second side section resists the conduction of heat from the first compartment to the second compartment thereby reducing the likelihood that air or lubricating fluid in the second compartment will increase in temperature due to heat transfer through the second side section.

Also disclosed is a method for manufacturing a gas turbine engine. The method may comprise providing a low pressure compressor section having a core flow path and configured to draw in and compress air in the core flow path, providing a housing defining a first compartment that encloses lubricating fluid and geared architecture configured to adjust fan speed of the engine, the housing disposed between the core flow path and the geared architecture and including an outer layer configured to be in thermal communication with the core flow path of the low pressure compressor section, and disposing an insulator adjacent to the outer layer, the insulator configured to resist heat transfer from the lubricating fluid to air in the core flow path when the gas turbine engine is operating.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine having an engine axis, the engine comprising:
   a gas generator that includes a core flow path;
   a low pressure compressor configured to draw in and compress air flowing along the core flow path in the low pressure compressor;
   a propulsor that includes a fan and geared architecture for driving the fan;
   a spool configured to drive the fan, and wherein the fan is configured to drive air, the fan having a fan speed;
   a housing defining a first compartment that separates the geared architecture and the core flow path, the housing including a shielded axial mid-section that includes an outer layer and an insulator adjacent to the outer layer, the shielded axial mid-section in thermal communication with the core flow path of the gas generator, and wherein the shielded axial mid-section is in thermal communication with the core flow path in the low pressure compressor; and
   wherein the core flow path in the low pressure compressor includes an inlet through which incoming air from the fan is received, an axial forward portion and an axial main portion, the forward portion extending between the inlet and the main portion, the main portion including a plurality of stationary vanes and rotating blades, wherein at least a portion of the shielded axial mid-section forms a common wall between the forward portion of the core flow path and the first compartment.

2. The gas turbine engine of claim 1, wherein the insulator is a foam insulator.

3. The gas turbine engine of claim 1, wherein the insulator is ceramic.

4. The gas turbine engine of claim 1, in which the shielded axial mid-section further includes an inner layer, wherein the insulator is disposed between the outer layer and the inner layer.

5. The gas turbine engine of claim 4, wherein the insulator is air.

6. The gas turbine engine of claim 4, wherein the insulator is air under vacuum pressure.

7. The gas turbine engine of claim 1, in which the shielded axial mid-section further includes an inner layer and a second insulator, wherein the first and second insulators are disposed between the outer layer and the inner layer.

8. The gas turbine engine of claim 1 further comprising a second compartment disposed adjacent to the first compartment and the main portion of the core flow path, in which the housing of the first compartment further includes a first side section proximal to a fan rotor and a second side section proximal to a low pressure compressor bearing, the second side section including the outer layer and the insulator, wherein the shielded axial mid-section is disposed between the first and second side sections, and the first compartment contains lubricating fluid and the second compartment contains air.

9. A gas turbine engine having an engine axis, the gas turbine engine comprising:
   a fan configured to drive air, the fan having a fan speed;
   a low pressure compressor having a core flow path, the low pressure compressor configured to draw in and compress air flowing along the core flow path, the core flow path in the low pressure compressor having; an inlet through which incoming air from the fan is received, a forward portion and a main portion, the forward portion extending between the inlet and the main portion, the main portion including a plurality of stationary vanes and rotating blades;
   a low pressure turbine;
   a spool including an inner shaft that connects the fan and the low pressure compressor to a low pressure turbine, the spool configured to drive the fan, the spool having a spool speed;
   geared architecture configured to change the fan speed to less than the spool speed;
   a housing defining a first compartment that encloses the geared architecture and lubricant, the housing disposed between the low pressure compressor core flow path and the engine axis, and including a shielded mid-section that includes an outer layer and an insulator, the shielded mid-section being in thermal communication with the core flow path of the low pressure compressor, wherein at least a portion of the shielded mid-section forms a common wall between the forward portion of the core flow path and the first compartment; and
   a second compartment disposed between the first compartment and the main portion of the core flow path, wherein the housing of the first compartment further includes a first side section proximal to a fan rotor and a second side section proximal to a low pressure compressor bearing, the second side section including the outer layer and the insulator, wherein the shielded mid-section is disposed between the first and second side sections, and the first compartment also contains lubricating fluid and bearings and the second compartment contains air.

10. The engine of claim 9, wherein the insulator is a sprayed-on foam insulator.

11. The engine of claim 9, wherein the insulator is ceramic.

12. The engine of claim 9, wherein the insulator faces the inside of the first compartment.

13. The engine of claim 9, in which the shielded mid-section further includes an inner layer, wherein the insulator is disposed between the outer layer and the inner layer.

14. The engine of claim 9, wherein the insulator is air.

15. The engine of claim 9, in which the shielded mid-section further includes an inner layer, wherein the insulator is sandwiched between the outer layer and the inner layer.

* * * * *